(12) United States Patent
Kim et al.

(10) Patent No.: US 7,733,342 B2
(45) Date of Patent: Jun. 8, 2010

(54) METHOD OF EXTRACTING 3D BUILDING INFORMATION USING SHADOW ANALYSIS

(75) Inventors: Taejung Kim, Incheon (KR); Tae-Yoon Lee, Incheon (KR)

(73) Assignee: INHA-Industry Partnership Institute, Inchon (KR)

( * ) Notice: Subject to any disclaimer, the term of this patent is extended or adjusted under 35 U.S.C. 154(b) by 884 days.

(21) Appl. No.: 11/593,984

(22) Filed: Nov. 6, 2006

(65) Prior Publication Data

US 2007/0115284 A1 May 24, 2007

(30) Foreign Application Priority Data

Nov. 24, 2005 (KR) .................... 10-2005-0112931

(51) Int. Cl.
*G06T 15/50* (2006.01)
*G06K 9/00* (2006.01)
(52) U.S. Cl. ...................... 345/426; 382/100
(58) Field of Classification Search ................. 382/100; 343/760; 345/426

See application file for complete search history.

(56) References Cited

OTHER PUBLICATIONS

Chu-Soo Ye et al., Journal of the Korean Siciety of Remote Sensing, vol. 16, No. 3, 2000, pp. 235-242 (in Korean including English Abstract).*
Chul-Soo Ye et al., Journal of the Korean Society of Remote Sensing, vol. 16, No. 3, 2000, pp. 235-242 (in Korean including English Abstract).

* cited by examiner

*Primary Examiner*—Samir A Ahmed
*Assistant Examiner*—Amara Abdi
(74) *Attorney, Agent, or Firm*—Bachman & LaPointe, P.C.

(57) ABSTRACT

Disclosed herein is a method of extracting three-dimensional building information using shadow analysis. In the method, an image of a building captured through a manmade satellite, an airplane or some other means, and metadata to be used for extraction of building information is received, the azimuth and altitude angles of a sun in an area of capture, and the azimuth and altitude angles of a camera are calculated. The contour of the roof of the building, the location and height of which are desired to be obtained, is extracted from the image. A height value is assigned to the extracted contour of the roof of the building, and the height value is adjusted until the assigned height value satisfies a predetermined condition. The vertical line and shadow of the building, which are based on the height value, is projected onto the image. The location of the building is extracted using the height value and vertical line of the building if the location of the projected shadow coincides with the location of the shadow of the building.

7 Claims, 6 Drawing Sheets

METHOD OF EXTRACTING 3D BUILDING INFORMATION USING SHADOW ANALYSIS

BACKGROUND OF THE INVENTION

1. Field of the Invention

The present invention relates generally to a building information extraction method that extracts the height and location of a building from an image captured by a manmade satellite or airplane and, more particularly, to a method of extracting three-dimensional building information using shadow analysis, which moves the contour of the roof of a building in the direction of the vertical line of the building after extracting the height of the building using a method based on a shadow projected onto an image, therefore the height and location of the building can be extracted from a single image.

2. Description of the Related Art

Since the launching of the first high-resolution manmade satellite, research into the extraction of information about geographical artifacts, such as buildings and roads, from high resolution satellite images has been conducted. In particular, research into the extraction of three-dimensional (3D) building information from aerial/satellite images have been actively carried out.

A representative conventional method of extracting the location and height of a building from images is a method using digital photogrammetry that measures the same location in two images from stereo images captured for the same area from different locations and calculates the 3D coordinates of the location based on the measurement results.

However, this method always requires two or more images, and requires a separate survey of a reference point and an accompanying complicated computing procedure in order to convert measured two-dimensional (2D) image points into 3D coordinates. Accordingly, the conventional technology has disadvantages in that a high cost is incurred and excessive processing time is taken.

Furthermore, in the field of aerial photograph/satellite image-based building information extraction, algorithms for determining whether a building exists and calculating the height of a building using a shadow have been developed (1. Cheol-Su Ye, and Koai-Hee Lee, 2000, Extraction of Building Information from Kompsat Satellite Image using Shadow Information, the journal of the Korea Society of Remote Sensing, 16(3):235-242; 2. Chungan Lin, and Ramakant Nevatia, 1998, Building Detection and Description from a Single Intensity Image, Computer Vision and Image Understanding, 72(2):101-121; and 3. Irvin, R. B., and D. M. McKeown Jr., 1989, Methods for exploiting the relationship between buildings and their shadows in aerial imagery, IEEE T. Systems, Man and Cybernetics, 19(6):1564-1575). However, these algorithms use shadows and measure the length of a shadow to calculate the height of a building, or to determine whether a building exists in an image, but do not use shadows to extract 3D building information.

SUMMARY OF THE INVENTION

Accordingly, the present invention has been made keeping in mind the above problems occurring in the prior art, and an object of the present invention is to provide a method of extracting 3D building information through shadow analysis, which can easily extract 3D building information, such as the height and location of a building, from a single image of the building, captured by a manmade satellite, airplane or the like, using a shadow but not using a separate reference point.

In order to accomplish the above object, the present invention provides a method of extracting three-dimensional building information using shadow analysis, including the steps of receiving an image of a building captured through a manmade satellite, an airplane or some other means, and metadata to be used for extraction of building information; calculating the azimuth and altitude angles of a sun in an area of capture, and the azimuth and altitude angles of a camera; extracting the contour of the roof of the building, the location and height of which are desired to be obtained, from the image; assigning a height value to the extracted contour of the roof of the building, and projecting the vertical line and shadow of the building, which are based on the assigned height value, onto the image; adjusting the height value until the shadow projected onto the image coincides with the location of the actual shadow of the building existing on the image; and extracting the location of the building using the height value and vertical line of the building.

The metadata is data that includes information about time and date of capture, an area of capture and a location of a camera for the image, an azimuth angle of the image is calculated if a direction of the image is different from a direction of north on a map or different with respect to longitude and latitude, and the azimuth angle of the image is an angle indicting a location of true north if a vertical axis of the image is a direction of north on the image.

The adjustment of the height value is performed by initially setting the height value to 0 and sequentially increasing the height value, the location of the building is extracted by translating the extracted contour of the roof of the building using the vertical line of the building, and if an area, onto which the shadow of the building based on the height of the building is projected, is not level but is inclined, or if an object having a different height exists in the area, the location of the building is obtained by obtaining an extent of inclination of the area or the height of the object.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
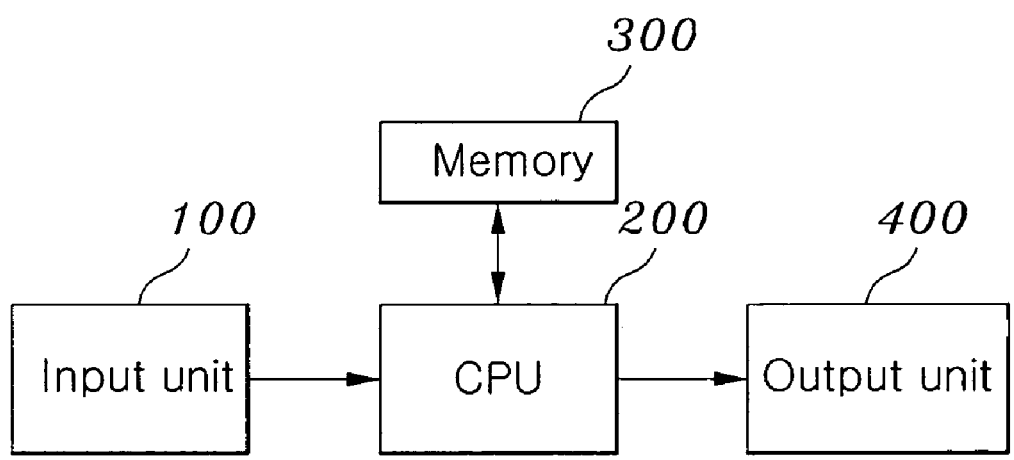
FIG. 1 is a diagram showing the configuration of hardware that is used to implement the present invention.

Reference now should be made to the drawings, in which the same reference numerals are used throughout the different drawings to designate the same or similar components.

FIG. 1 is a diagram showing the configuration of a typical computer to which the present invention is applied. The computer includes an input unit 100 for receiving various data from a user, a Central Processing Unit (CPU) 200 for performing almost all functions of the present invention using the data received through the input unit 100, memory 300 for temporarily storing data required in the operations of the CPU 200, and an output unit 400 for outputting the processing results of the CPU 200. The output unit 400 may be one of various types of output devices, such as a monitor or a printer.

Figure 2:
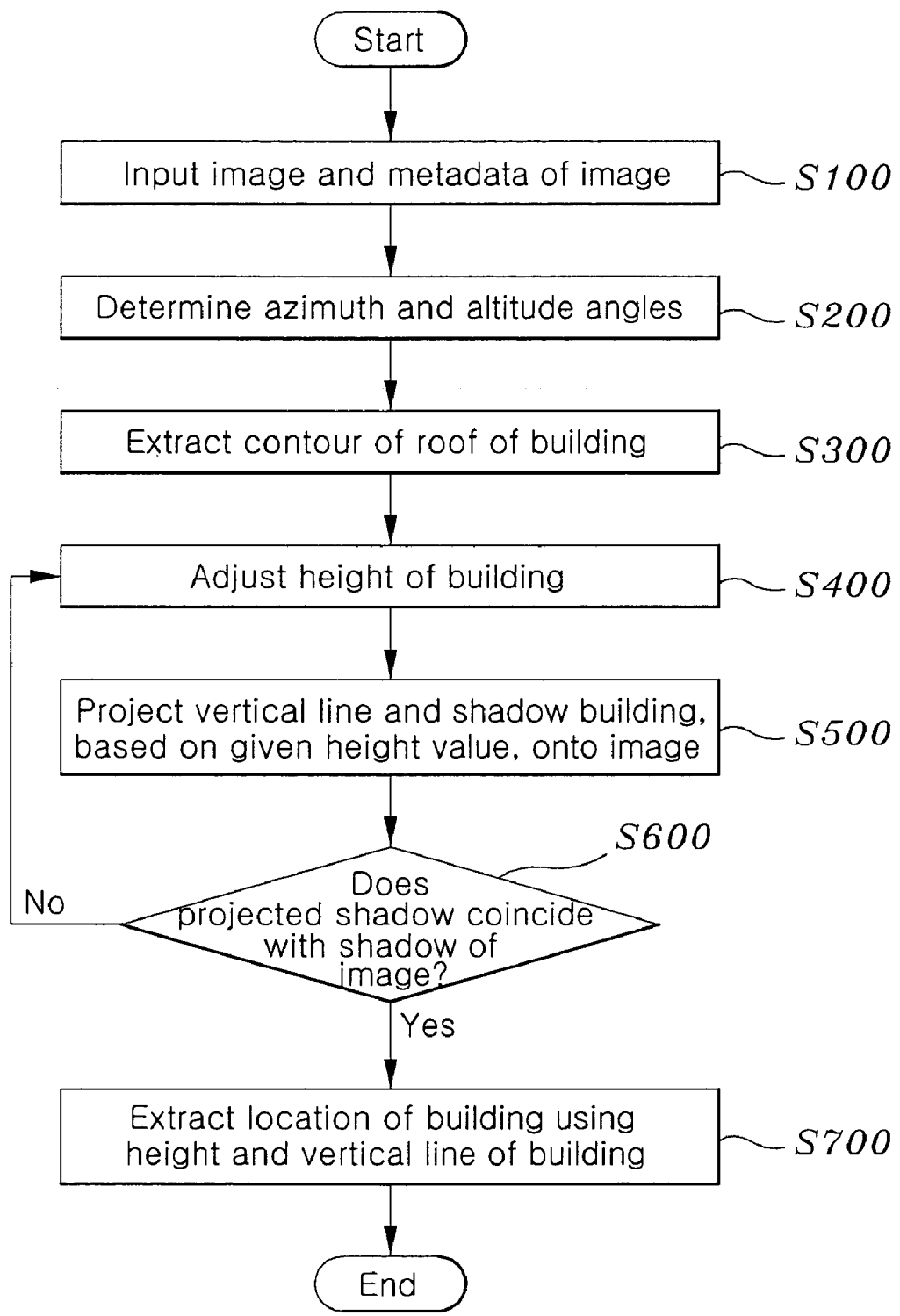
FIG. 2 is a flowchart of a process of extracting the height and location of a building according to the present invention.

The present invention performed in the system will be described with reference to the flowchart of FIG. 2 below.

First, in order to use the present invention, an image of a building, which is captured through a manmade satellite, an airplane or some other means, and metadata, which includes the time and date of capture of the image, the area of capture of the image and the approximate location of a camera, are received through the input unit 100 at step S100.

Thereafter, the CPU 200 calculates the azimuth and altitude angles of the sun in the area of capture, and the azimuth and altitude angles of the camera.

Furthermore, if the direction of the image is different from the direction of north on a map or is different with respect to longitude and latitude, the azimuth angle of the image is calculated at step S200.

In this case, the azimuth angle of the image is used to utilize the azimuth angles of the sun and camera on the image. In order to utilize the azimuth angles of the sun and the camera on the image, an actual north location, which is a reference for azimuth angles, must be found on the image. If the vertical axis of the image is the direction of north on the image, an angle indicting the location of true north is the azimuth angle of the image.

Since the method of calculating azimuth and altitude angles from the time and date of capture, the area of capture, and the approximate location of a camera is a well-known technology, a detailed description thereof is omitted here.

After the azimuth and altitude angles have been calculated, a user extracts the contour of the roof of the building from the image, the location and height of which are desired to be found at step S300.

In this case, according to the principle of photography, the location of the roof of the building can be easily found with the naked eye. Meanwhile, the location of the building in a plan view corresponds to the contour of the bottom of the building along which the building meets the ground surface, and this location is different from the location of the roof of the building.

Furthermore, the contour of the bottom of the building is hidden by the side surface of the building or the like, therefore it may be impossible to identify it from the image.

After the contour of the roof of the building has been extracted, a height value is assigned to the extracted contour of the roof of the building, and a process of adjusting the height value until the location of the shadow projected onto the image coordinates based on the assigned height coincides with the location of the actual shadow of the building existing on the image is performed at step S400.

A method of efficiently adjusting the height value includes a method of initially setting the height value to 0 and sequentially increasing the height value.

When the height value is given, the vertical line of the building and the shadow of the building are projected onto the image based on the given height value at step S500.

A method of projecting the vertical line of the building and the shadow of the building onto the image based on the given height value will be described in detail below.

If the location of the shadow projected onto the image coincides with the location of the shadow of the building existing on the image at step S600, the set height value is the actual height value of the building. Using the above-described method, the height value of a building can be obtained from a single image.

Once the height value of the building is obtained, the shape and length of the vertical line of the building based on the corresponding height value can be accurately obtained. By translating the contour of the roof of the building, extracted at step S300, using the vertical line, the contour of the bottom of the building can be obtained. Using the above-described method, the location of a building can be obtained from a single image at step S700.

The method of extracting the height and location of a building using the azimuth angle of an image, the azimuth and altitude angles of the sun, and the azimuth and altitude angles of a camera will be described in greater detail below.

Figure 3:
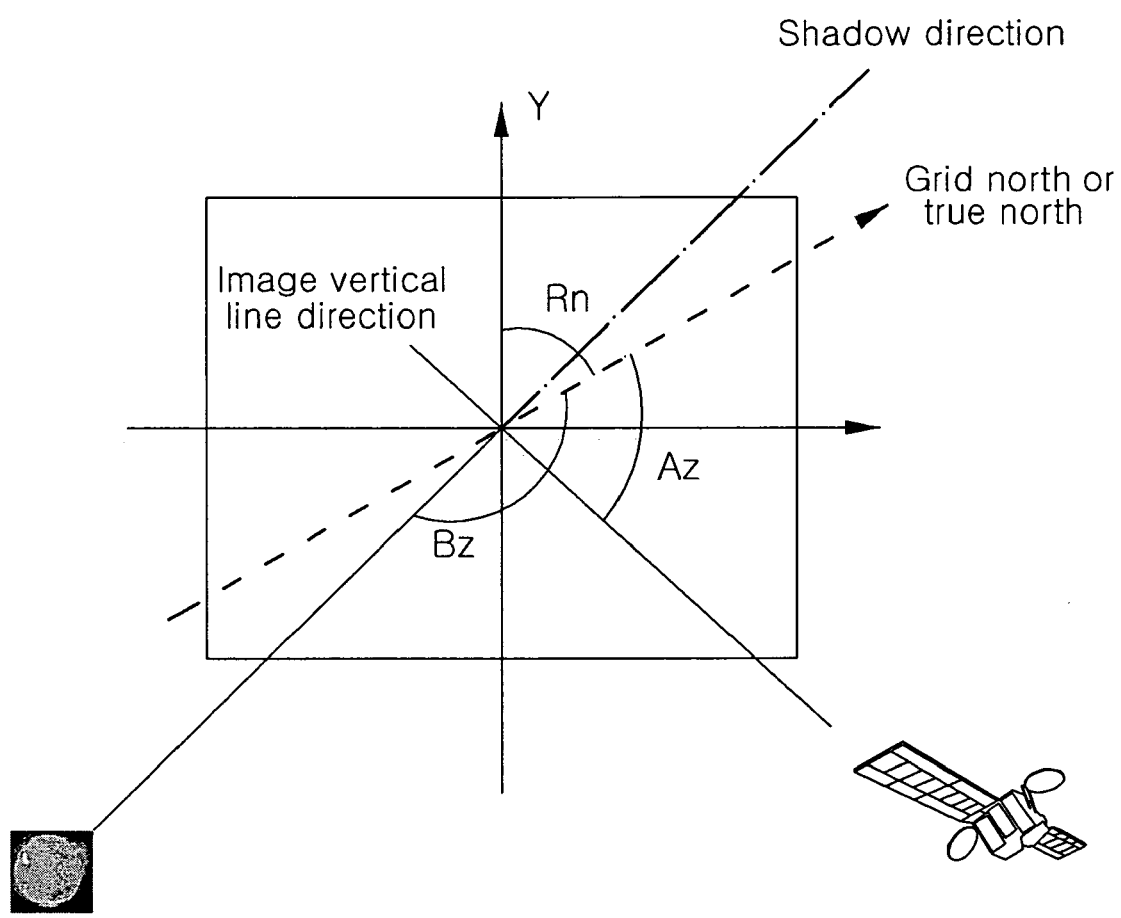
FIG. 3 is a diagram illustrating the relationship between a vertical line and the direction of a shadow based on the azimuth angle of an image, the azimuth angle of the sun and the azimuth angle of a camera.

FIG. 3 is a diagram illustrating the relationship between a vertical line and the direction of a shadow based on the azimuth angle of an image, the azimuth angle of the sun and the azimuth angle of a camera. In this case, the azimuth angle of the image refers to an angle Rn between the direction of north (Y-axis) and the direction of grid north or true north.

In FIG. 3, the azimuth angle of the camera refers to an angle Az between the camera and the direction of grid north or true north. Since all vertical lines are directed toward the direction of the camera, the direction of the vertical line on the image can be determined using the above principle.

Furthermore, the azimuth angle of the sun refers to an angle Bz between the sun and the direction of grid north or true north. Since all shadows are determined depending on the azimuth angle of the sun, the direction of the shadow can be determined on the image.

In a similar manner, using the altitude angle of the sun and the altitude angle of the camera, the lengths of the shadow and the vertical line depending on the height of the building can be determined.

First, using the altitude angle Se of the sun, the length of the shadow for the given height h of a building can be calculated using the following Equation 1.

$$\text{Shadow length } Sl = h \times \tan(Se) \quad (1)$$

Also, using the altitude angle Ce of the camera, the length of a vertical line for the given height h of a building can be calculated using the following Equation 2.

$$\text{Vertical line length } Vl = h \times \tan(Ce)$$

After the length of the shadow, the length of the vertical line, the direction of the shadow and the direction of the vertical line have been obtained, the shadow and the vertical line for the given height h of the building can be drawn using the reduced scale or resolution of the image.

Figure 4A:
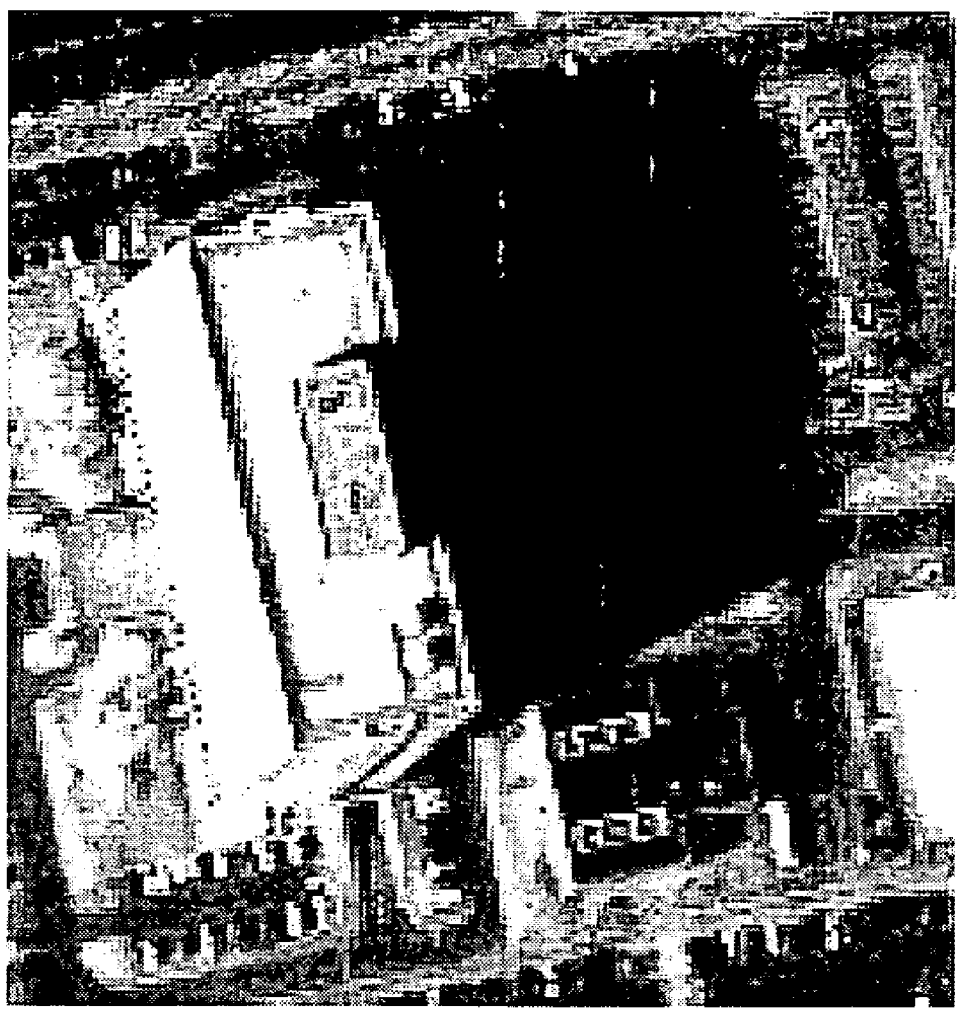
FIGS. 4A and 4B are photos showing an example in which the height value and location of a building are extracted from an image according to the present invention.
Figure 4B:
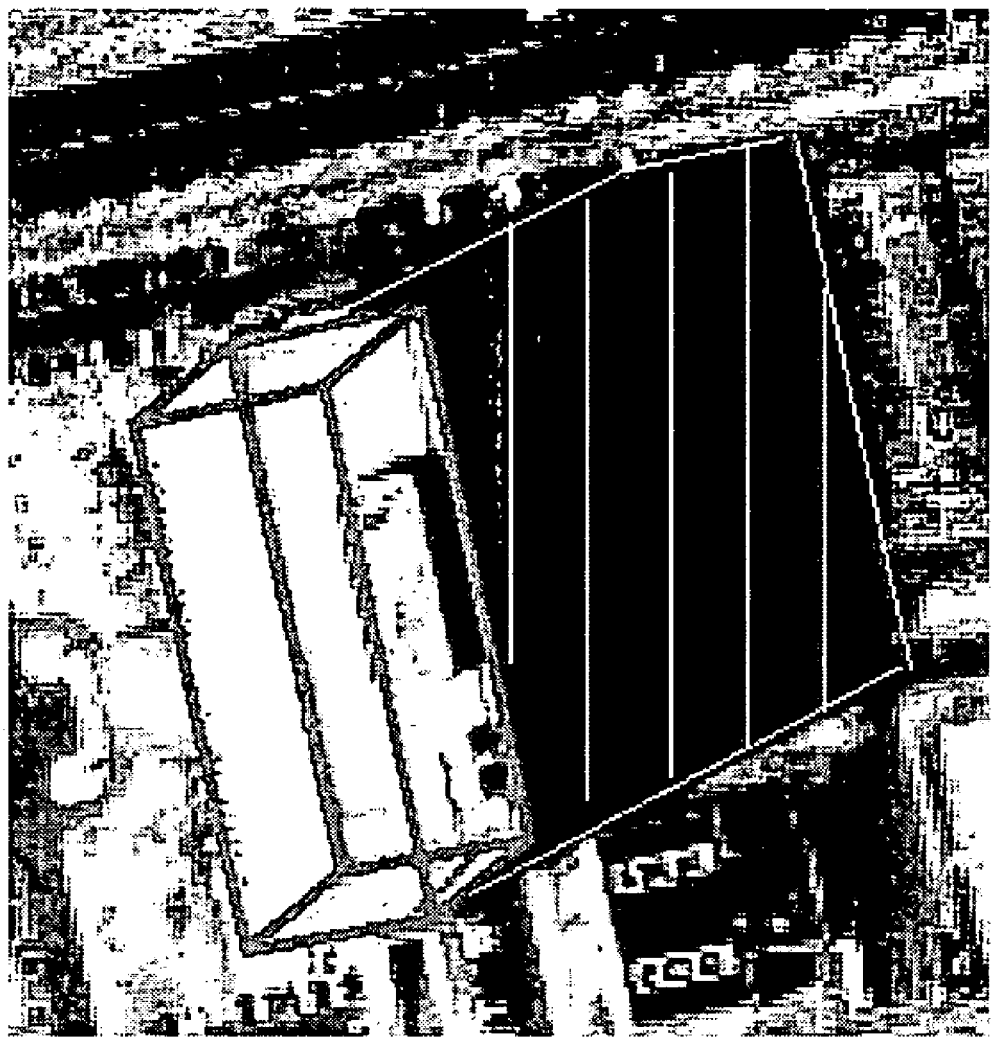

FIGS. 4A and 4B show an example in which the height value and location of a building are extracted from an image using the present invention.

FIG. 4A shows a building and a shadow captured in an image prior to the application of the present invention, and FIG. 4B shows the location of the building that is obtained by extracting the contour of the roof of the building so as to utilize the present invention, adjusting the height value of the building so that a shadow based on the height value of the building coincides with the shadow of the actual image, and moving the contour of the roof of the building by a distance corresponding to the length of the vertical line of the building.

Figure 5:
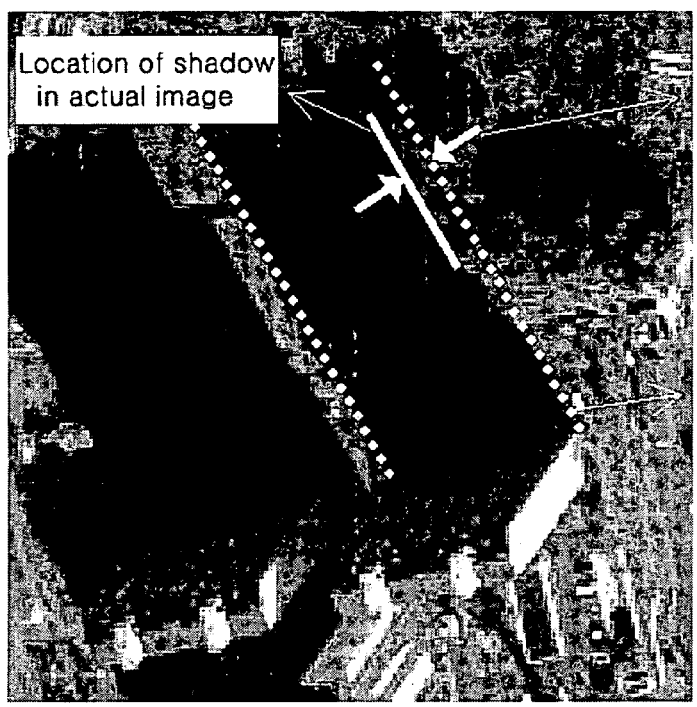
FIG. 5 is a photo showing an example of extracting the difference in the height of the ground surface when the height of a building is given, according to the present invention.

If an area, onto which a shadow is projected, is not level but is inclined or if an object having a different height exists in the area when the height value of a building is obtained from an image using the present invention or when the shadow of a building having a known height value is projected onto an image, the location of the shadow projected onto the image is different from that in other cases. FIG. 5 schematically illustrates the principle of obtaining the extent of inclination of the area and the height of the object in the above-described cases.

As shown in FIG. 5, the height can be calculated by measuring the distance by which the location of a projected shadow is changed due to the difference in the height of the ground surface. According to this principle, when a building having a different height exists in the area in which the shadow of a building having a known height exists, the height of the former building can be calculated by measuring the distance by which the location of a shadow is changed due to the building having the different height.

The above-described present invention can be applied to geographical analysis, cartography, scenery analysis, etc. based on images of specific areas that are captured using a manmade satellite, an airplane or some other means.

As described above, the method of extracting 3D building information using shadow analysis according to the present invention has advantages in that the height and location of a building can be extracted from a single image, therefore the cost can be considerably reduced compared to the case of using two or more images, and complicated photogrammetic equations are not used, therefore the method of the present invention can be used for multiple purposes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of extracting three-dimensional building information using shadow analysis, comprising the steps of:
    receiving an image of a building captured through a manmade satellite, an airplane or some other means, and metadata to be used for extraction of building information;
    calculating azimuth and altitude angles of a sun in an area of capture by said manmade satellite, airplane, or some other means, and azimuth and altitude angles of a camera; extracting a contour of a roof of the building, a location and a height of which are desired to be obtained, from the image;
    assigning a height value to the extracted contour of the roof of the building, and projecting a vertical line and shadow of the building, which are based on the assigned height value, onto the image; adjusting the height value until the shadow projected onto the image coincides with a location of the actual shadow of the building existing on the image;
    extracting the location of the building using the height value and vertical line of the building if the location of the shadow projected onto the image coincides with the location of a shadow of the building existing on the image.

2. The method as set forth in claim 1, wherein the metadata is data that includes information about time and date of capture, an area of capture and a location of a camera for the image.

3. The method as set forth in claim 1, wherein an azimuth angle of the image is calculated if a direction of the image is different from a direction of north on a map or different with respect to longitude and latitude.

4. The method as set forth in claim 3, wherein the azimuth angle of the image is an angle indicting a location of true north if a vertical axis of the image is a direction of north on the image.

5. The method as set forth in claim 1, wherein the adjustment of the height value is performed by initially setting the height value to 0 and sequentially increasing the height value.

6. The method as set forth in claim 1, wherein the location of the building is extracted by translating the extracted contour of the roof of the building using the vertical line of the building.

7. The method as set forth in claim 1, wherein, if an area, onto which the shadow of the building based on the height of the building is projected, is not level but is inclined, or if an object having a different height exists in the area, the location of the building is obtained by obtaining an extent of inclination of the area or the height of the object.

* * * * *